(12) United States Patent
Entwistle

(10) Patent No.: US 12,047,119 B2
(45) Date of Patent: Jul. 23, 2024

(54) SYSTEMS AND METHODS FOR TRANSFERRING DATA COMMUNICATION IN A ROTATING PLATFORM OF A LIDAR SYSTEM

(71) Applicant: LG INNOTEK CO., LTD., Seoul (KR)

(72) Inventor: Mark D. Entwistle, New Egypt, NJ (US)

(73) Assignee: LG INNOTEK CO., LTD., Seoul (KR)

( * ) Notice: Subject to any disclaimer, the term of this patent is extended or adjusted under 35 U.S.C. 154(b) by 129 days.

(21) Appl. No.: 17/689,012

(22) Filed: Mar. 8, 2022

(65) Prior Publication Data
US 2022/0393762 A1 Dec. 8, 2022

Related U.S. Application Data

(60) Provisional application No. 63/202,257, filed on Jun. 3, 2021.

(51) Int. Cl.
*H04B 10/00* (2013.01)
*G01S 7/00* (2006.01)
(Continued)

(52) U.S. Cl.
CPC .......... *H04B 10/1123* (2013.01); *G01S 7/003* (2013.01); *G01S 17/10* (2013.01);
(Continued)

(58) Field of Classification Search
CPC . H04B 10/112; H04B 10/1123; H04B 10/114; H04B 10/1143; H04B 10/1149;
(Continued)

(56) References Cited

U.S. PATENT DOCUMENTS 9,425,654 B2   8/2016   Lenius et al.
9,778,364 B2 *   10/2017   Gruver ................. G01S 7/4808
(Continued)

FOREIGN PATENT DOCUMENTS

CN   109932703 A   6/2019
KR   20210011329 A   2/2021
(Continued)

OTHER PUBLICATIONS

International Search Report of PCT/US2022/032165 dated Oct. 4, 2022, 5 pages.
(Continued)

*Primary Examiner* — Hanh Phan
(74) *Attorney, Agent, or Firm* — Birch, Stewart, Kolasch & Birch, LLP

(57) ABSTRACT

A system and method are disclosed for providing a bi-directional data communication link within a LIDAR assembly that has a stationary portion attached to an autonomous vehicle and a second portion rotatably connected to the stationary portion. The second portion may include one or more emitting/receiving devices (e.g., lasers) for detecting objects surrounding the autonomous vehicle. A first printed circuit board assembly (PCBA) having a first optical transceiver may be located within the stationary portion. A second PCBA having a second optical transceiver may be located within the second portion. A hollow shaft may be positioned so as to extend between the stationary portion and the second portion.

20 Claims, 13 Drawing Sheets

(51) Int. Cl.
*G01S 17/10* (2020.01)
*G01S 17/931* (2020.01)
*H04B 10/112* (2013.01)
*H04B 10/114* (2013.01)
*H04B 10/40* (2013.01)

(52) U.S. Cl.
CPC ........ *G01S 17/931* (2020.01); *H04B 10/1143* (2013.01); *H04B 10/40* (2013.01)

(58) Field of Classification Search
CPC ..... H04B 10/40; G01S 7/4817; G01S 7/4816; G01S 7/4813; G01S 17/931; G01S 17/10; G01S 7/481
USPC ....... 398/118, 119, 127, 128, 129, 130, 131, 398/135, 136, 158, 159, 172, 164; 356/3.1, 4.01, 5.01
See application file for complete search history.

(56) References Cited

U.S. PATENT DOCUMENTS

| | | |
|---|---|---|
| 9,882,433 B2 | 1/2018 | Enius et al. |
| 10,042,042 B2 | 8/2018 | Miremadi |
| 10,109,183 B1 | 10/2018 | Franz et al. |
| 10,122,416 B2 | 11/2018 | Berger et al. |
| 2015/0091374 A1 | 4/2015 | Lenius et al. |
| 2018/0118041 A1 | 5/2018 | Lenius et al. |
| 2018/0191404 A1* | 7/2018 | Berger .................. H04B 5/0037 |
| 2018/0364334 A1 | 12/2018 | Xiang et al. |
| 2019/0011285 A1 | 1/2019 | Utermoehlen et al. |
| 2019/0011290 A1 | 1/2019 | Utermoehlen et al. |
| 2019/0011537 A1 | 1/2019 | Utermoehlen et al. |
| 2019/0064325 A1 | 2/2019 | Miremadi |
| 2019/0118737 A1 | 4/2019 | Li et al. |
| 2019/0146066 A1 | 5/2019 | Kunze |
| 2019/0158150 A1 | 5/2019 | Kirby et al. |
| 2019/0179028 A1 | 6/2019 | Pacala et al. |
| 2019/0204845 A1 | 7/2019 | Grossman et al. |
| 2019/0252916 A1 | 8/2019 | Venkatesan et al. |
| 2020/0025880 A1* | 1/2020 | Pacala ................... G01S 7/486 |
| 2021/0116547 A1 | 4/2021 | Lu et al. |

FOREIGN PATENT DOCUMENTS

| | | |
|---|---|---|
| WO | 2018125709 A1 | 7/2018 |
| WO | 2019113368 A1 | 6/2019 |
| WO | 2019152540 A1 | 8/2019 |
| WO | 2019158306 A1 | 8/2019 |
| WO | 2021051784 A1 | 3/2021 |

OTHER PUBLICATIONS

Written Opinion of PCT/US2022/032165 dated Oct. 4, 2022, 6 pages.

* cited by examiner

SYSTEMS AND METHODS FOR TRANSFERRING DATA COMMUNICATION IN A ROTATING PLATFORM OF A LIDAR SYSTEM

CROSS-REFERENCE TO RELATED APPLICATIONS

This application claims the benefit of U.S. provisional application Ser. No. 63/202,257 filed Jun. 3, 2021, the disclosure of which is hereby incorporated in its entirety by reference herein.

TECHNICAL FIELD

The present disclosure relates to Light Detection and Ranging (LIDAR) systems including the transfer of data within a LIDAR system.

BACKGROUND

LIDAR systems may be used for various purposes. For example, a LIDAR system may be incorporated with a vehicle (such as an autonomous or semi-autonomous vehicle) and may be used to provide range determinations for the vehicle. That is, the vehicle may traverse an environment and may use the LIDAR system to determine the relative distance of various objects in the environment relative to the vehicle. This may be accomplished by emitting light from an emitter device of the LIDAR system into the environment, and detecting return light from the environment (for example, after reflecting from an object in the environment) using a detector device of the LIDAR system. Based on an amount of time that elapses between the time at which the light is emitted and a time at which the return light is detected (for example, a "Time of Flight" of the light), it may be determined how far an object is from the LIDAR system.

Additionally, the one or more emitter devices and one or more detectors may be housed in a rotating portion of the LIDAR system, such that light may be emitted and return light may be detected in various directions around the LIDAR system as the rotating portion of the LIDAR system rotates relative to the fixed portion. This may allow the vehicle to ascertain distance information for objects located within a full 360-degree field of view of the vehicle, rather than only in one direction that the one or more emitter devices and/or one or more detector devices are pointing.

SUMMARY

A system and method are disclosed for providing a bi-directional data communication link within a LIDAR assembly that has a stationary portion attached to an autonomous vehicle and a second portion rotatably connected to the stationary portion. The second portion may include one or more emitting/receiving devices (e.g., lasers) for detecting objects surrounding the autonomous vehicle. A first printed circuit board assembly (PCBA) having a first optical transceiver may be located within the stationary portion. A second PCBA having a second optical transceiver may be located within the second portion. A hollow shaft may be positioned so as to extend between the stationary portion and the second portion.

The first optical transceiver may be disposed at a first open end of the hollow shaft and the second optical transceiver may be disposed at a second open end of the hollow shaft. The first optical transceiver may also be configured to transmit a first optical data signal within the hollow shaft to the second optical transceiver. The second optical transceiver may be configured to transmit a second optical data signal within the hollow shaft to the first optical transceiver.

It is also contemplated the optical data signals may be transmitted using an optical pulse train. The optical data signals may also be encoded by the first or second PCBA prior to being transmitted to the first or second optical transceiver. Similarly, the first or second PCBA may be configured to decode the optical data signals.

The first optical transceiver and the second optical transceiver may be positioned to maintain optical alignment along a rotational boundary axis between the stationary portion and the second portion. An airtight seal may also be formed between the first optical transceiver, the second optical transceiver, and the hollow shaft to prevent degradation of the first optical signal and the second optical signal by external contaminants.

Lastly, the first/second PCBAs and the first/second transceivers may be connected using a first differential communication link such as a first low voltage differential signaling system or a first current-mode logic system. Lastly, one or more bearings may be connected to an outer surface of the hollow shaft and to the second portion.

BRIEF DESCRIPTION OF THE DRAWINGS

The accompanying drawings are incorporated herein and form a part of the specification.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Again, LIDAR systems generally include a rotating portion that houses emitter devices providing range determinations for a vehicle (e.g., Time of Flight data). The range determination data is then transferred from the rotating portion to a fixed portion of the LIDAR system for use by a vehicle's control system (e.g., ECU) or for transmission to an external server. It is contemplated large amounts of data downloaded are downloaded from the rotating portion to the fixed portion. It is also contemplated that data or information (e.g., update files) may be uploaded from the fixed portion to the rotating portion. In addition to data transfer, the light emitting sensors operating within the rotating portion of a LIDAR system typically require significant amounts of electrical power to operate. Lastly, LIDAR systems generally require stability mechanisms that can withstand vehicle vibration during normal operation.

As such, a novel LIDAR structure is disclosed providing concentric features for each of a bearing structure, data uplink, data downlink, power transfer, driver motor, and azimuth detection. It is contemplated the LIDAR subsystems may be constructed to stack radially from a center axis as discussed below.

Figure 1A:
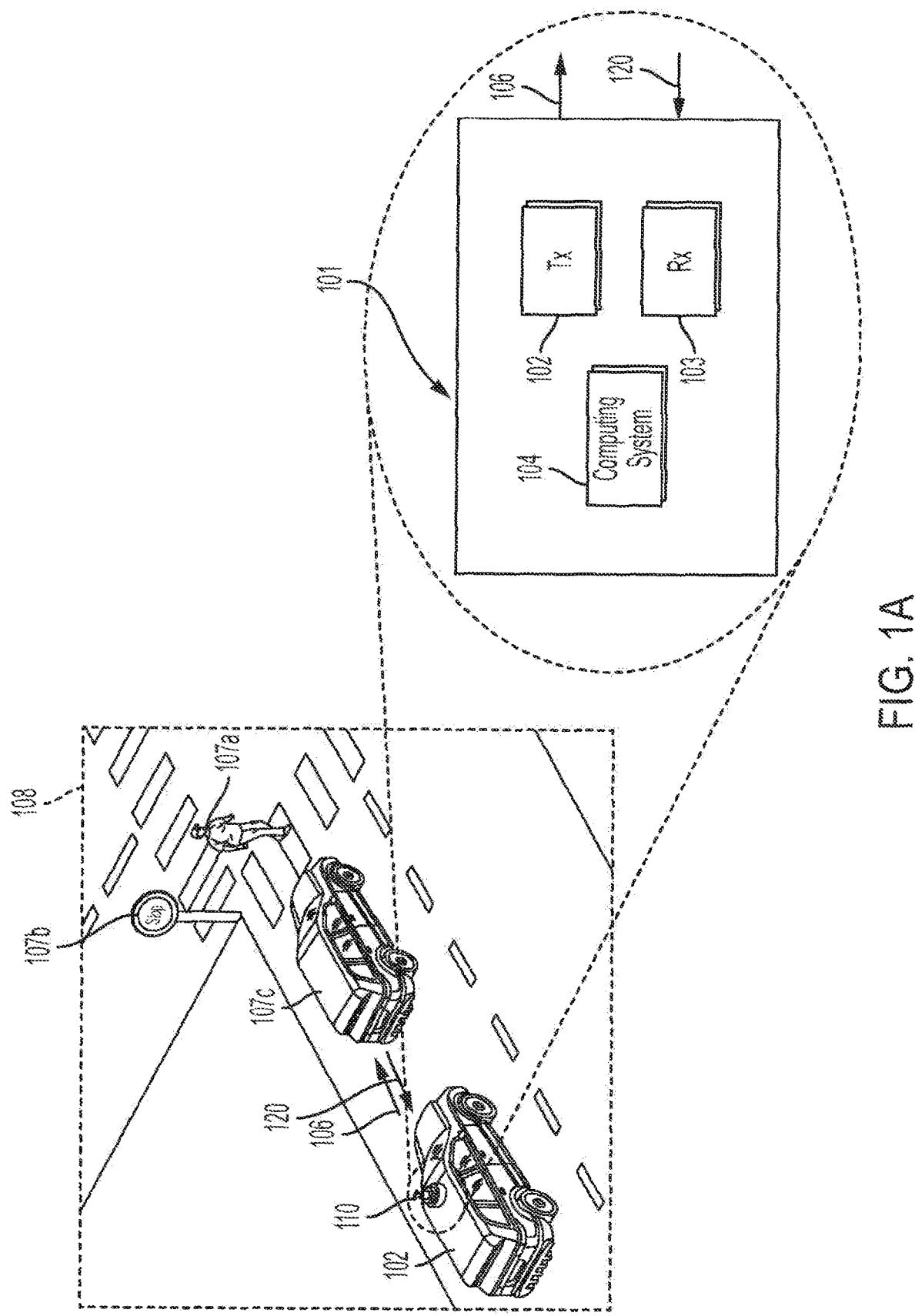
FIG. 1A depicts an illustrative LIDAR vehicle system.

For example, FIG. 1A depicts a schematic of an illustrative LIDAR system 101 used within a vehicle 102. In some embodiments, the LIDAR system 101 may include at least one or more emitting devices 102, one or more detector devices 103, and/or one or more computing systems 104. The LIDAR system 101 may include one or more emitter-side optical elements and/or one or more receiver-side optical elements. Additionally, external to the LIDAR system 101 may be an environment 108 that may include one or more objects (for example object 107a and/or object 107b). Hereinafter, reference may be made to elements such as "emitting device," "detector device," "circuit," "controller," and/or "object," however such references may similarly apply to multiple of such elements as well.

In some embodiments, an emitting device 102 may be a laser diode for emitting a light pulse (for example, emitted light 106). A detector device 103 may be a photodetector, such as an Avalanche Photodiode (APD), or more specifically an APD that may operate in Geiger Mode (however any other type of photodetector may be used as well). The detector device 103 may be used to detect return light 120 from the environment 108. The return light 120 may be based on the emitted light 106. That is, the emitting device 102 may emit light into the environment 108, the light may reflect from an object in the environment and may return to the LIDAR system 101 as return light 120. It should be noted that the terms "photodetector" and "detector device" may be used interchangeably.

The computing system 104 (which may be referred to as "signal processing elements," "signal processing systems," or the like) may be used to perform any of the operations associated with the LIDAR assembly or otherwise. For example, the computing system 104 may be used to perform signal processing on magnetic field data received by one or more sensors (for example, any of the sensors described with respect to FIGS. 2-4 and 9-11, as well as any other sensors described herein) on a LIDAR assembly of the LIDAR system, as well as any other operations associated with the LIDAR system 101. Finally, an object 107a and/or 107b may be any object that may be found in the environment 108 of the LIDAR system 101 (for example, object 107a may be a vehicle and object 107b may be a pedestrian, but any other number or type of objects may be present in the environment 108 as well).

In some embodiments, any of the elements of the LIDAR system 101 (for example, the one or more emitting devices 102, one or more detector devices 103, and/or one or more computing systems 104, as well as any other elements of the LIDAR system 101) may be included within a LIDAR assembly 110 as described herein. The LIDAR assembly 110 may include at least a base, a sensor body, and a motor. The motor may include a stator, a rotor, and a shaft affixed to the rotor. The stator may be configured to drive the rotor in rotation. The motor may be affixed to the base and sensor body such that the motor may be able to rotate the sensor body with respect to the base. The stator may also be affixed to a motor housing, which may be affixed to the base, while the shaft may be affixed to the sensor body (however, in some cases, the sensor body may alternatively be affixed to the rotor instead of being directly affixed to the shaft).

Figure 1B:
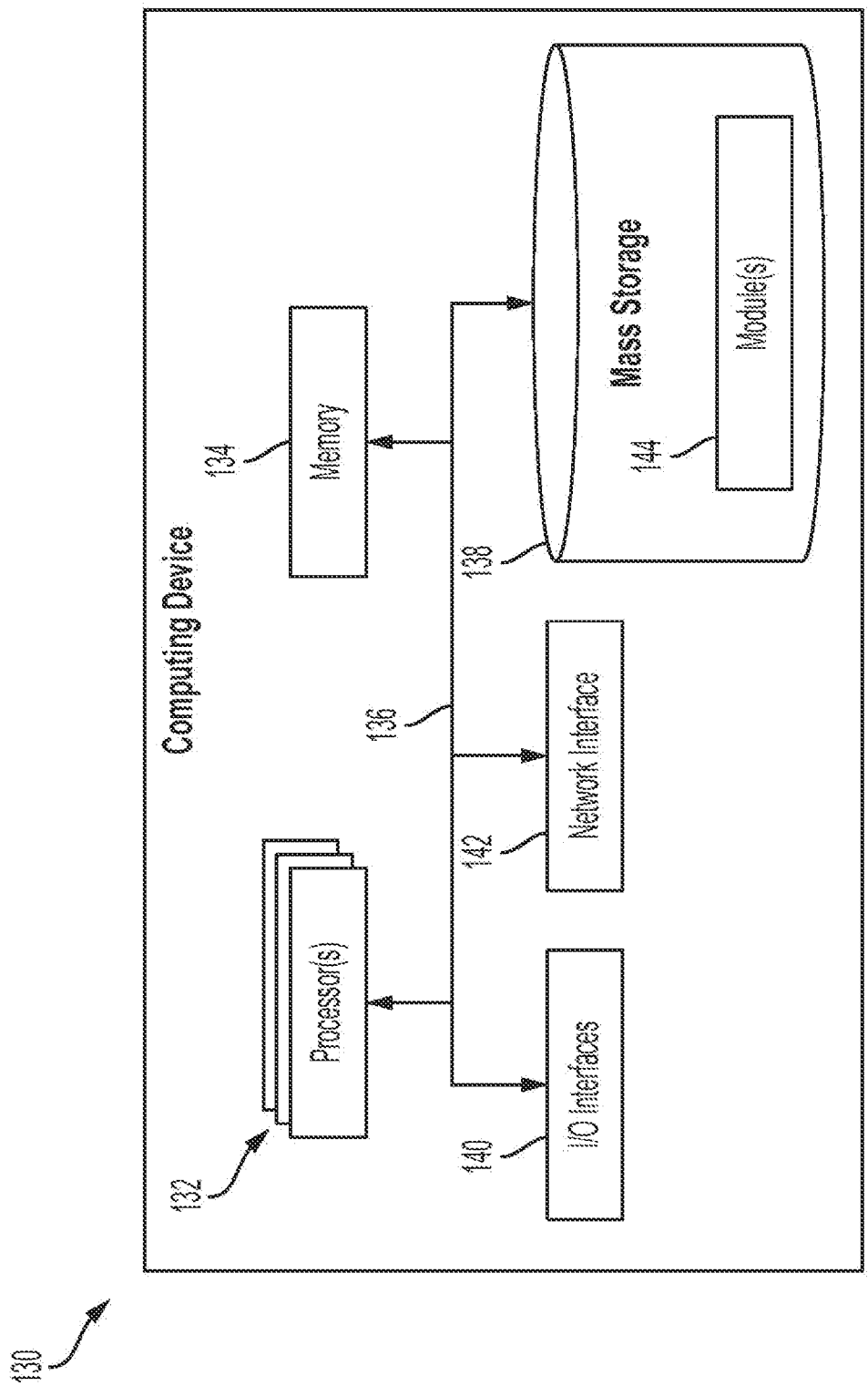
FIG. 1B depicts a block diagram schematic of the illustrative LIDAR vehicle system.

FIG. 1B illustrates details of an exemplary computing system 130 in accordance with one or more embodiments of this disclosure including, for example, computing system 104. The computing system 130 may include at least one processor 132 that executes instructions that are stored in one or more memory devices (referred to as memory 134). The instructions can be, for instance, instructions for implementing functionality described as being carried out by one or more modules and systems disclosed above or instructions for implementing one or more of the methods disclosed above. The processor(s) 132 can be embodied in, for example, a CPU, multiple CPUs, a GPU, multiple GPUs, a TPU, multiple TPUs, a multi-core processor, a combination thereof, and the like. In some embodiments, the processor(s) 132 can be arranged in a single processing device. In other embodiments, the processor(s) 132 can be distributed across two or more processing devices (e.g., multiple CPUs; multiple GPUs; a combination thereof; or the like).

A processor can be implemented as a combination of processing circuitry or computing processing units (such as CPUs, GPUs, or a combination of both). Therefore, for the sake of illustration, a processor can refer to a single-core processor; a single processor with software multithread execution capability; a multi-core processor; a multi-core processor with software multithread execution capability; a multi-core processor with hardware multithread technology; a parallel processing (or computing) platform; and parallel computing platforms with distributed shared memory. Additionally, or as another example, a processor can refer to an integrated circuit (IC), an ASIC, a digital signal processor (DSP), an FPGA, a PLC, a complex programmable logic device (CPLD), a discrete gate or transistor logic, discrete hardware components, or any combination thereof designed or otherwise configured (e.g., manufactured) to perform the functions described herein.

The processor(s) 132 can access the memory 134 by means of a communication architecture 136 (e.g., a system bus). The communication architecture 136 may be suitable for the particular arrangement (localized or distributed) and type of the processor(s) 132. In some embodiments, the communication architecture 136 can include one or many bus architectures, such as a memory bus or a memory controller; a peripheral bus; an accelerated graphics port; a processor or local bus; a combination thereof, or the like. As an illustration, such architectures can include an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnect (PCI) bus, a PCI-Express bus, a Personal Computer Memory Card International Association (PCMCIA) bus, a Universal Serial Bus (USB), and/or the like.

Memory components or memory devices disclosed herein can be embodied in either volatile memory or non-volatile memory or can include both volatile and non-volatile memory. In addition, the memory components or memory devices can be removable or non-removable, and/or internal or external to a computing device or component. Examples of various types of non-transitory storage media can include hard-disc drives, zip drives, CD-ROMs, digital versatile disks (DVDs) or other optical storage, magnetic cassettes, magnetic tape, magnetic disk storage or other magnetic storage devices, flash memory cards or other types of memory cards, cartridges, or any other non-transitory media suitable to retain the desired information and which can be accessed by a computing device.

As an illustration, non-volatile memory can include read-only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory devices or memories of the operational or computational environments described herein are intended to include one or more of these and/or any other suitable types of memory. In addition to storing executable instructions, the memory 134 also can retain data.

Each computing system 130 also can include mass storage 138 that is accessible by the processor(s) 130 by means of the communication architecture 136. The mass storage 138 can include machine-accessible instructions (e.g., computer-readable instructions and/or computer-executable instructions). In some embodiments, the machine-accessible instructions may be encoded in the mass storage 138 and can be arranged in components that can be built (e.g., linked and compiled) and retained in computer-executable form in the mass storage 138 or in one or more other machine-accessible non-transitory storage media included in the computing system 130. Such components can embody, or can constitute, one or many of the various modules disclosed herein. Such modules are illustrated as modules 144. In some instances, the modules may also be included within the memory 134 as well.

Execution of the modules 144, individually or in combination, by at least one of the processor(s) 132, can cause the computing system 130 to perform any of the operations. Each computing system 130 also can include one or more input/output interface devices 140 (referred to as I/O interface 140) that can permit or otherwise facilitate external devices to communicate with the computing system 130. For instance, the I/O interface 140 may be used to receive and send data and/or instructions from and to an external computing device.

The computing system 130 also includes one or more network interface devices 142 (referred to as network interface(s) 142) that can permit or otherwise facilitate functionally coupling the computing system 130 with one or more external devices. Functionally coupling the computing system 130 to an external device can include establishing a wireline connection or a wireless connection between the computing system 130 and the external device. The network interface devices 142 can include one or many antennas and a communication processing device that can permit wireless communication between the computing system 130 and another external device. For example, within a vehicle, between a vehicle and a smart infrastructure system, between multiple vehicles, between two smart infrastructure systems, etc. Such a communication processing device can process data according to defined protocols of one or several radio technologies. The radio technologies can include, for example, 3G, Long Term Evolution (LTE), LTE-Advanced, 5G, IEEE 800.11, IEEE 800.16, Bluetooth, ZigBee, near-field communication (NFC), and the like. The communication processing device can also process data according to other protocols as well, such as communication area network (CAN), vehicle-to-infrastructure (V2I) communications, vehicle-to-vehicle (V2V) communications, and the like. The network interface(s) 512 may also be used to facilitate peer-to-peer ad-hoc network connections as described herein.

It should further be appreciated that the disclosed LiDAR system (e.g., LIDAR system 1010) may include alternate and/or additional hardware, software, or firmware components beyond those described or depicted without departing from the scope of the disclosure. More particularly, it should be appreciated that software, firmware, or hardware components depicted as forming part of the computing device 600 are merely illustrative and that some components may not be present or additional components may be provided in various embodiments.

Figure 2:
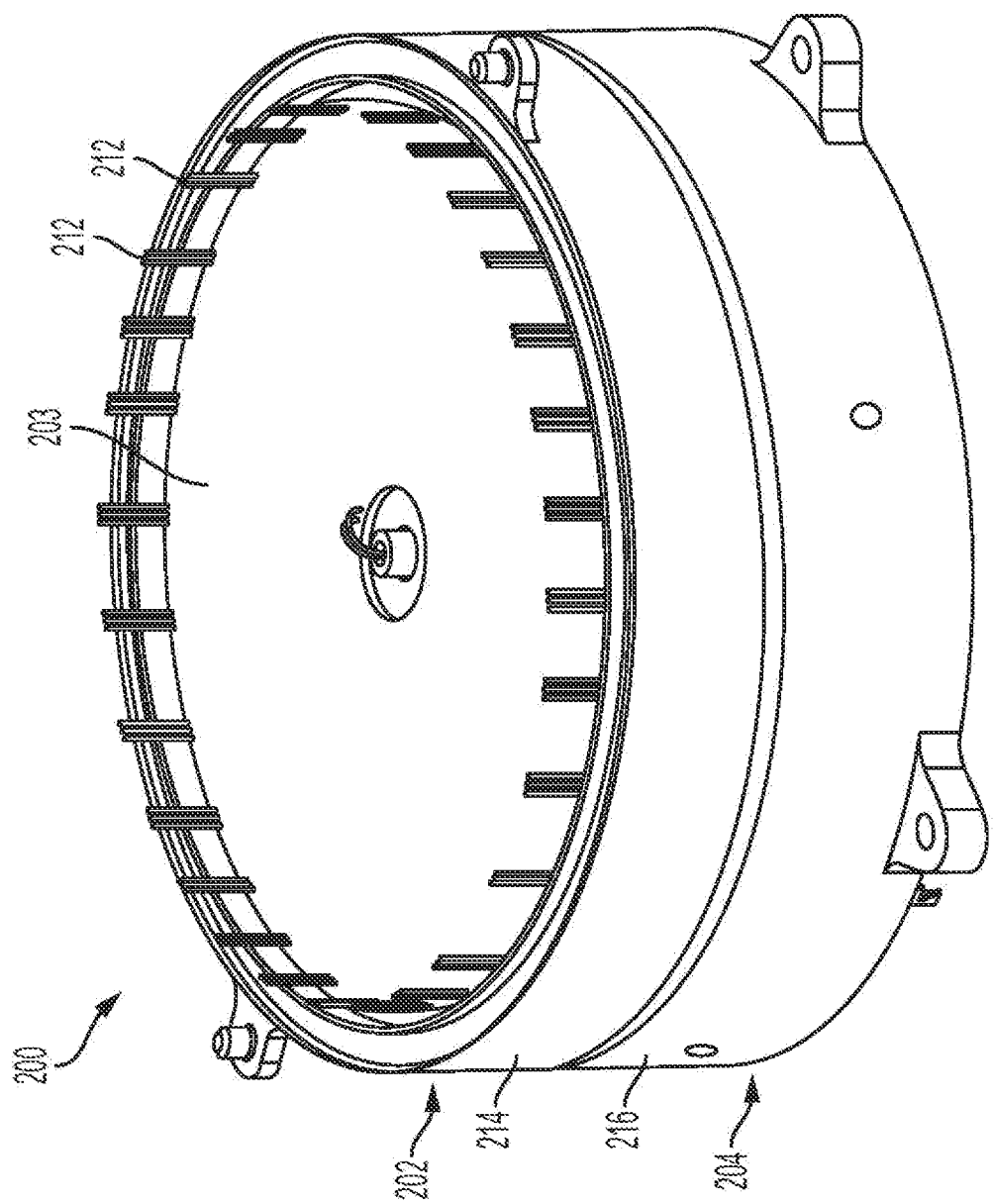
FIG. 2 depicts an isometric view of a LIDAR assembly.

FIG. 2 depicts an isometric view of a LIDAR assembly 200 that may be the same as LIDAR assembly 110 described with respect to FIG. 1, as well as any other LIDAR assembly described herein. In some embodiments, the LIDAR assembly 200 may include at least a first portion 204 and a second portion 202. The first portion 204 may include a first housing 216 and the second portion 202 may include a second housing 214. The first housing 216 and second housing 214 may provide protection for any elements included within the first portion 204 and/or the second portion 202, such as protection from weather conditions, contaminants in the environment, etc. The first portion 204 may be a stator of the LIDAR assembly 200. That is, the first portion 204 may be a portion of the LIDAR assembly 200 that may remain fixed relative to other portions of the LIDAR assembly 200. Likewise, the second portion 202 may be a rotor of the LIDAR assembly 200. That is, the second portion 202 may be a portion of the LIDAR assembly 200 that may rotate relative to other portions of the LIDAR assembly 200, such as the first portion 204 (for example, the stator).

In some embodiments, the second portion 202 as including one or more printed circuit boards (for example, printed circuit board 203, as well as any other printed circuit boards not depicted in the figure). The printed circuit board 203 may represent the sensor body (or a portion of the sensor body) of the LIDAR assembly as described above. That is, the sensor body of the LIDAR assembly may be affixed to the second portion 202 of the LIDAR assembly 200 and may rotate along with the second portion 202 relative to the first portion 204. It is contemplated, the printed circuit board 203 may include any number and/or type of electronic components used by the LIDAR assembly 200. For example, the printed circuit board 203 may include any of the emitting devices 102, one or more detector devices 103, and/or one or more computing systems 104 as described with respect to FIG. 1.

The printed circuit board 203 may also include one or more sensors. In some embodiments, the one or more sensors may include one or more magnetic field sensors 212 that may be used to measure the magnetic fields produced by various magnets (not depicted in the figure) affixed to the first portion 204 of the LIDAR assembly 200. For example, the one or more magnetic field sensors may be Hall sensors. The one or more magnetic field sensors 212 may be arranged in a circular fashion around the circumference of the printed circuit board 203. Any of the elements described as being included in the example printed circuit board 203 illustrated in the figure may be included in any number of other printed circuit boards not depicted in the figure. The one or more sensors may also include any other types of sensors, such as one or more temperature sensors.

Figure 3:
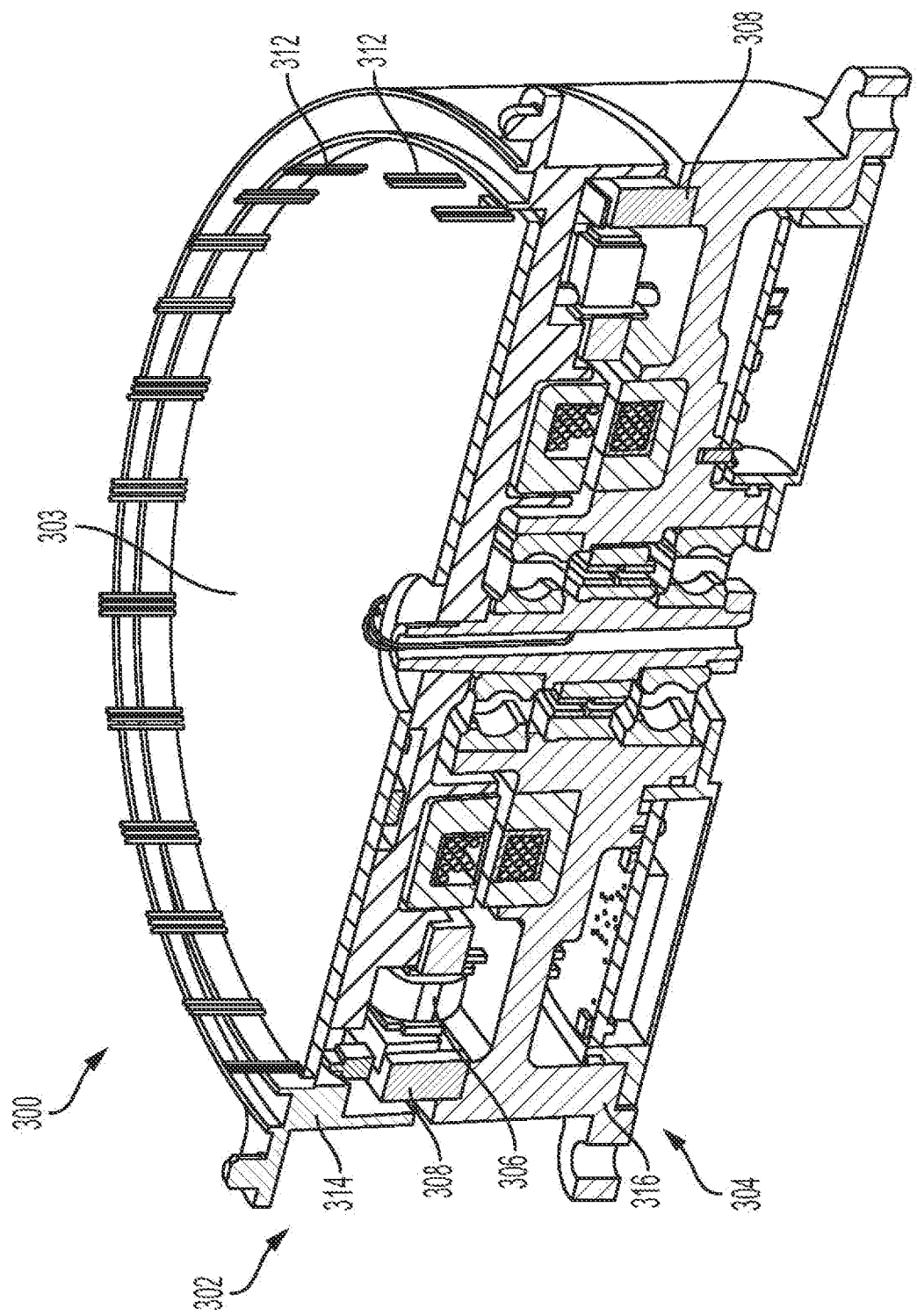
FIG. 3 depicts a cross-section view of a LIDAR assembly.

FIG. 3 depicts an exemplary cross-section view of a LIDAR assembly 300. The LIDAR assembly 300 may be the same as LIDAR assembly 200. That is, FIG. 3 may depict the same (or a similar) LIDAR assembly 300 as the LIDAR assembly 200 depicted in FIG. 2, but may present a cross-section view to provide an illustration of elements that may be included within the LIDAR assembly 300. For example, LIDAR assembly 300 may include a first portion 304 and a second portion 302. The first portion 304 may include a first housing 316, and the second portion 302 may include a second housing 314. The LIDAR assembly 300 may also include a printed circuit board 303. As with the printed circuit board 203 depicted in FIG. 2, the printed circuit board 303 may not depict any electronic components, but include any electronic components associated with the LIDAR system. The same may apply to any other printed circuit board depicted and/or described herein. As described above with respect to the LIDAR assembly 200, the first portion 304 may be a stator of the LIDAR assembly 300. That is, the first portion 304 may be a portion of the LIDAR assembly 300 that may remain fixed relative to other portions of the LIDAR assembly 300. Likewise, the second portion 302 may be a rotor of the LIDAR assembly 300. That is, the second portion 302 may be a portion of the LIDAR assembly 300 that may rotate relative to other portions of the LIDAR assembly 300, such as the first portion 304 (for example, the stator).

Through the cross-section view it may be illustrated that the first portion 304 of the LIDAR assembly 300 may further include one or more magnets 308. The one or more magnets 308 may be provided on the first portion 304 in a circular arrangement and may be permanently or removably affixed to the first portion 304. The one or more magnets 308 may be arranged around a circumference of the first portion 304 such that elements of the second portion 302, such as the windings 306, may be provided adjacent to the one or more magnets 308, but located closer to a center point of the LIDAR assembly 300. The one or more magnets 308 may also be arranged such that they may be positioned in line with the one or more magnetic field sensors 312 included on the second portion 302 of the LIDAR assembly 300.

The cross-section view of the LIDAR assembly 300 may also illustrate that the second portion 302 may include one or more windings 306. In some embodiments, the one or more windings 306 may be arranged more internally than the one or more magnets 308 provided on the first portion 304 of the LIDAR assembly 300. The one or more windings 306 may be used to interact with the one or more magnets 308 to produce a rotation of the second portion 302 of the LIDAR assembly 300 relative to the first portion 304 of the LIDAR assembly 300. That is, the LIDAR assembly 300 may operate by providing a current to the one or more windings 306 on the second portion 302 of the LIDAR assembly 300. The current may cause the one or more windings 306 to produce a corresponding magnetic field, which may interact with the magnetic fields produced by the one or more magnets 308. This interaction may cause a rotation of the second portion 302 of the LIDAR assembly 300 relative to the first portion 304. However, this is merely one example of a mechanism by which the rotation of the second portion 302 of the LIDAR assembly 300 may be produced.

Figure 4:
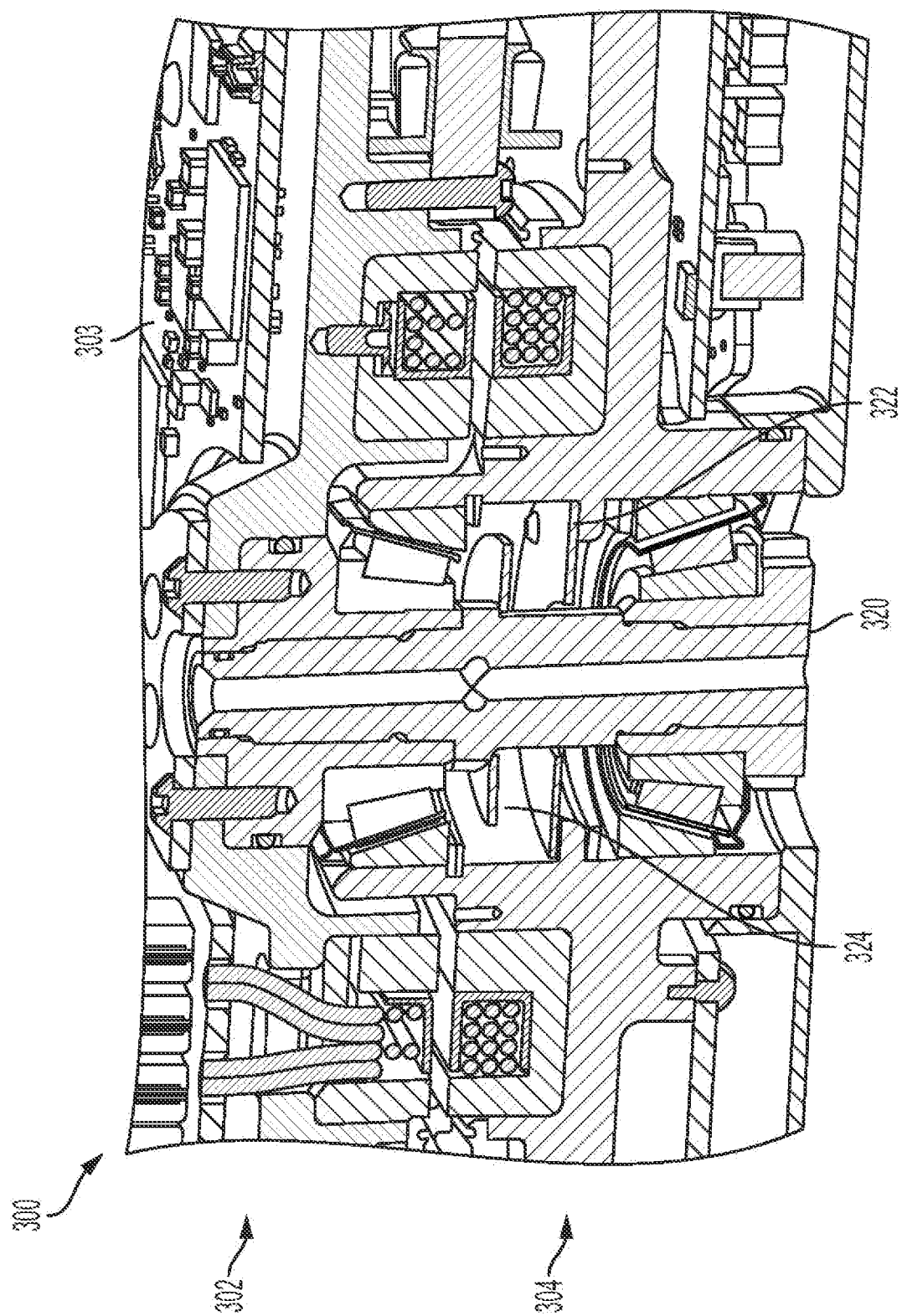
FIG. 4 depicts an exemplary cross-section view illustration of a center portion of LIDAR assembly.

FIG. 4 depicts another exemplary cross-section view illustration of a center portion of LIDAR assembly 300. Again, first portion 304 may be fixed whereas second portion 302 may be rotatable. A center shaft 320 may be positioned and extend between the first portion 304 and second portion 302. A first antenna array circuit 322 may be positioned around center shaft 320 and may be affixed to the first portion. It is contemplated the first antenna array 322 may be affixed to the center shaft 320 using an adhesive or securing mechanism (e.g., screw). The first antenna array 322 may be affixed such that it does not rotate in conjunction with the second portion 302.

It is further contemplated that a second antenna array 324 may further be positioned above or below the first antenna array 322. For instance, FIG. 4 illustrates the second antenna array 324 being positioned above first antenna array 322. The second antenna array 324 may further be affixed to the center shaft 320 or second portion 302. It is contemplated that when attached to the center shaft 320 or second portion 302, the second antenna array 324 may be rotatable in relation to the fixed first antenna array 322.

Figure 6:
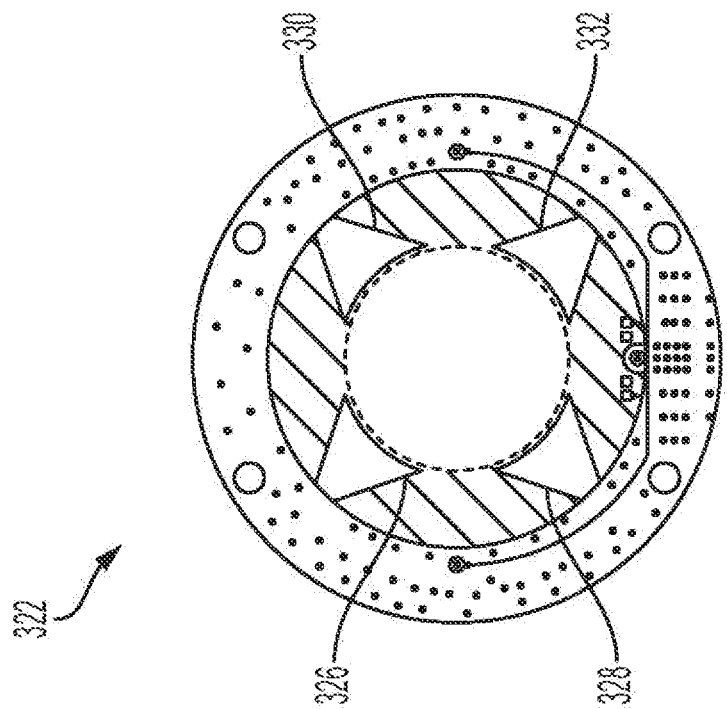
FIG. 6 depicts an exemplary illustration of a second antenna array used within the LIDAR assembly.
Figure 5:
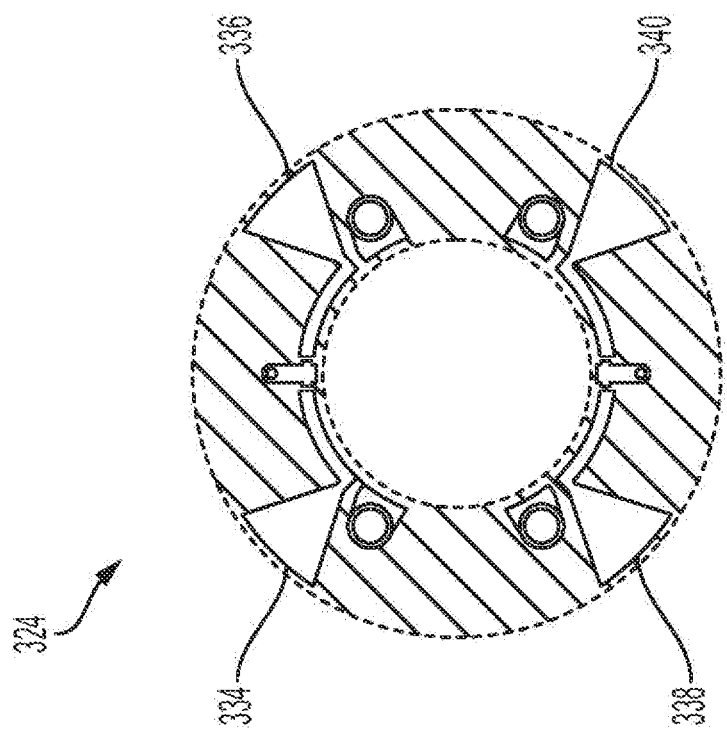
FIG. 5 depicts an exemplary illustration of a first antenna array used within the LIDAR assembly.

FIGS. 5 and 6 provide exemplary illustrations of the first antenna array 322 and the second antenna array 324 discussed with respect to FIG. 4. As illustrated, the first antenna array 322 may include a plurality of static antennas 326-332. Similarly, the second antenna array 324 may also include a plurality of rotating antennas 334-340. It is contemplated the plurality of static antennas 326-332 and the plurality of rotating antennas 334-340 generate a horizontally polarized quarter wave monopole array that provides data to be transferred between the first antenna array 322 and second antenna array 324.

Figure 7:
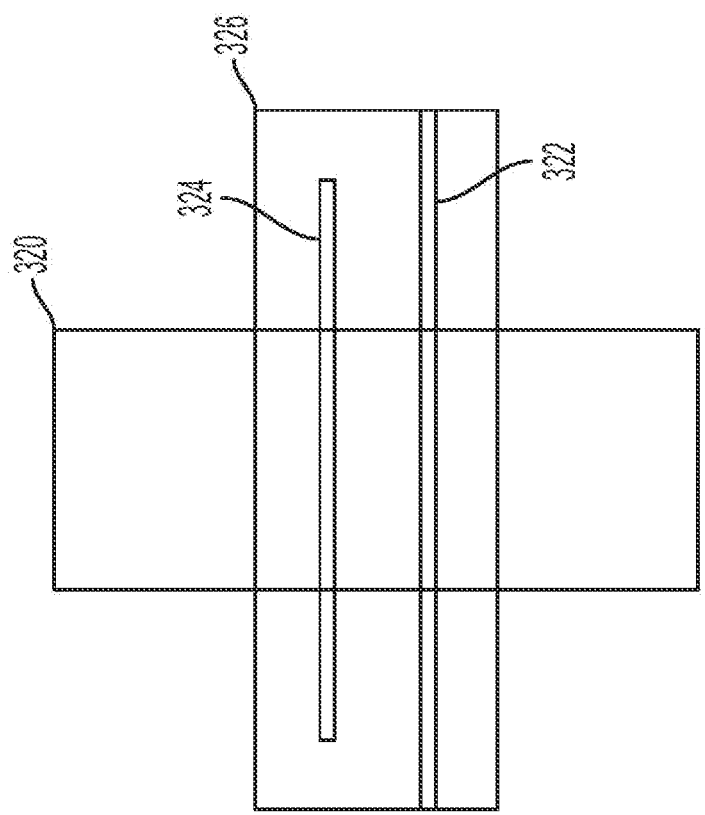
FIG. 7 depicts an exemplary illustration of the first antenna array situated below the second antenna array.

FIG. 7 further depicts the affixed (i.e., non-rotatable) first antenna array 322 situated below the second antenna array 324. FIG. 7 illustrates a gap may exist between the first antenna array 322 and the second antenna array 324. Again, the second antenna array 324 may be attached and be rotated by the center shaft 320. As such, the second antenna array 324 may operably rotate 360-degrees in relation to the first antenna array 322. It is also contemplated an electrically sealed cavity 326 may be included to enclose the cavity currents that originate on the center shaft by the rotating antennas 334-340 and travel to the static antennas 326-332 during operation. The electrically sealed cavity 326 may be constructed using a static housing and bearings that allow center shaft 320 and second antenna array 324 to rotate.

Figure 9:
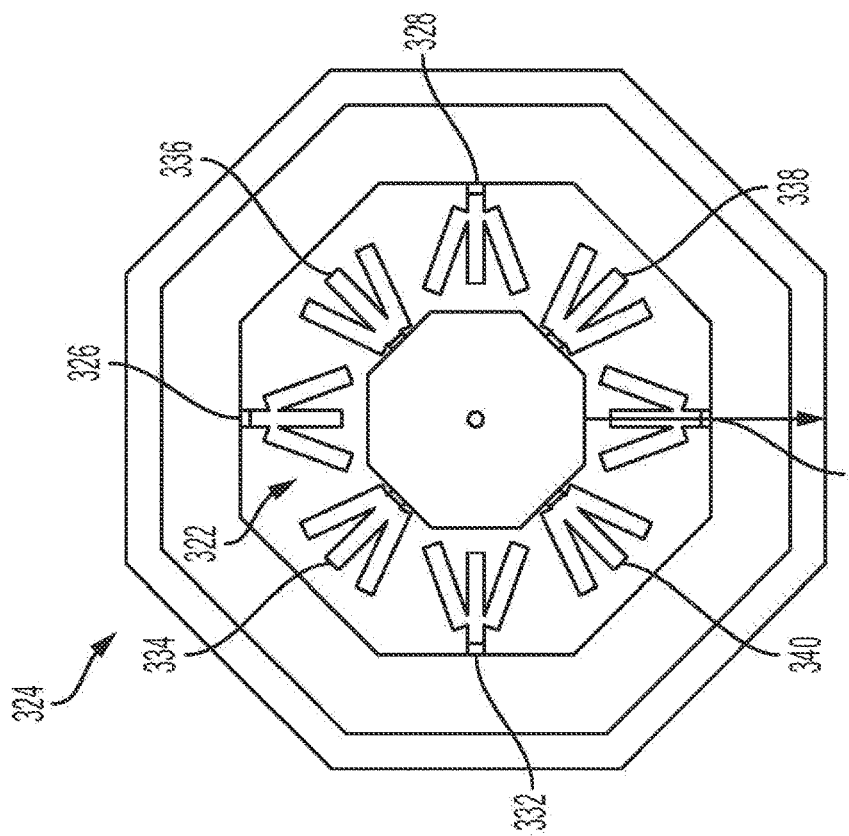
FIG. 9 depicts an exemplary illustration of the first antenna array and the second antenna array during operation.
Figure 8:
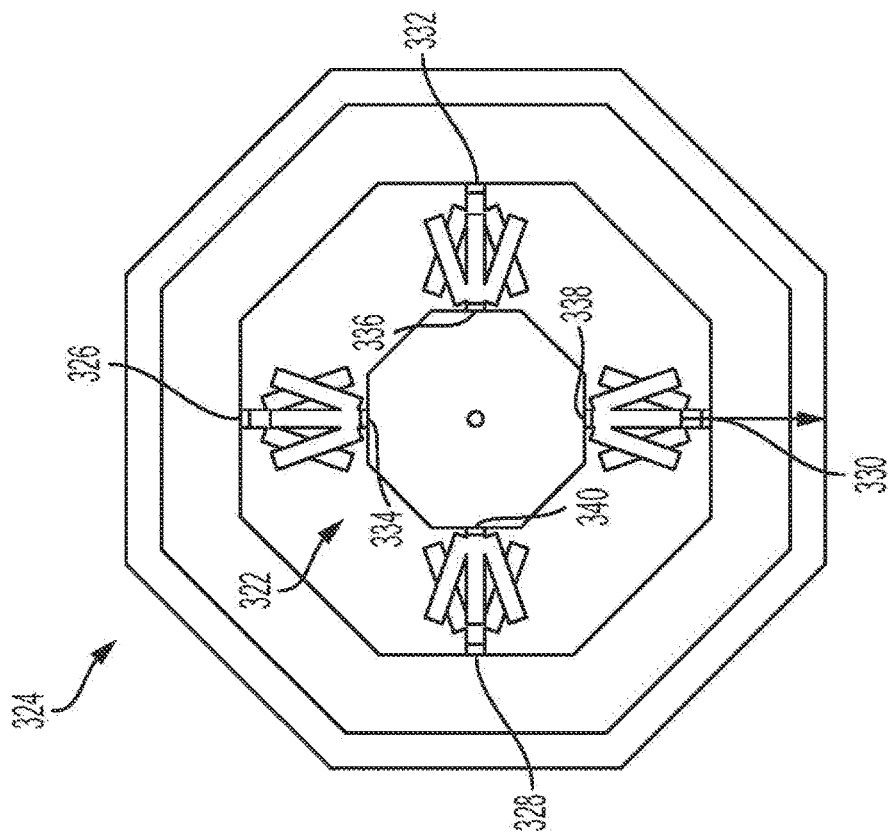
FIG. 8 depicts an exemplary illustration of the first antenna array and the second antenna array during operation.

FIGS. 8 and 9 are further exemplary illustrations of the first antenna array 322 and the second antenna array 324 during operation. FIG. 8. Illustrates the plurality of static antennas 326-332 in-line with the plurality of rotating antennas 334-340. It is contemplated that when the static antennas 326-332 are in-line with the plurality of rotating antennas 334-340 there may only be a 3 dB peak-to-peak variation in the frequency between the first antenna array 322 and the second antenna array 324. FIG. 8. Illustrates the plurality of static antennas 326-332 at a 45-degree rotation in relation to the plurality of rotating antennas 334-340. When the static antennas 326-332 are at a 45-degree rotation in relation to the plurality of rotating antennas 334-340 there may only be a 2.5 dB peak-to-peak variation in the frequency between the first antenna array 322 and the second antenna array 324. It is contemplated that peak-to-peak variations greater than 6 dB may not allow suitable data transfer (i.e., upload and download) between the first antenna array 322 and the second antenna array 324. Instead, peak-to-peak variations would preferably be maintained below 4 dB.

Figure 10:
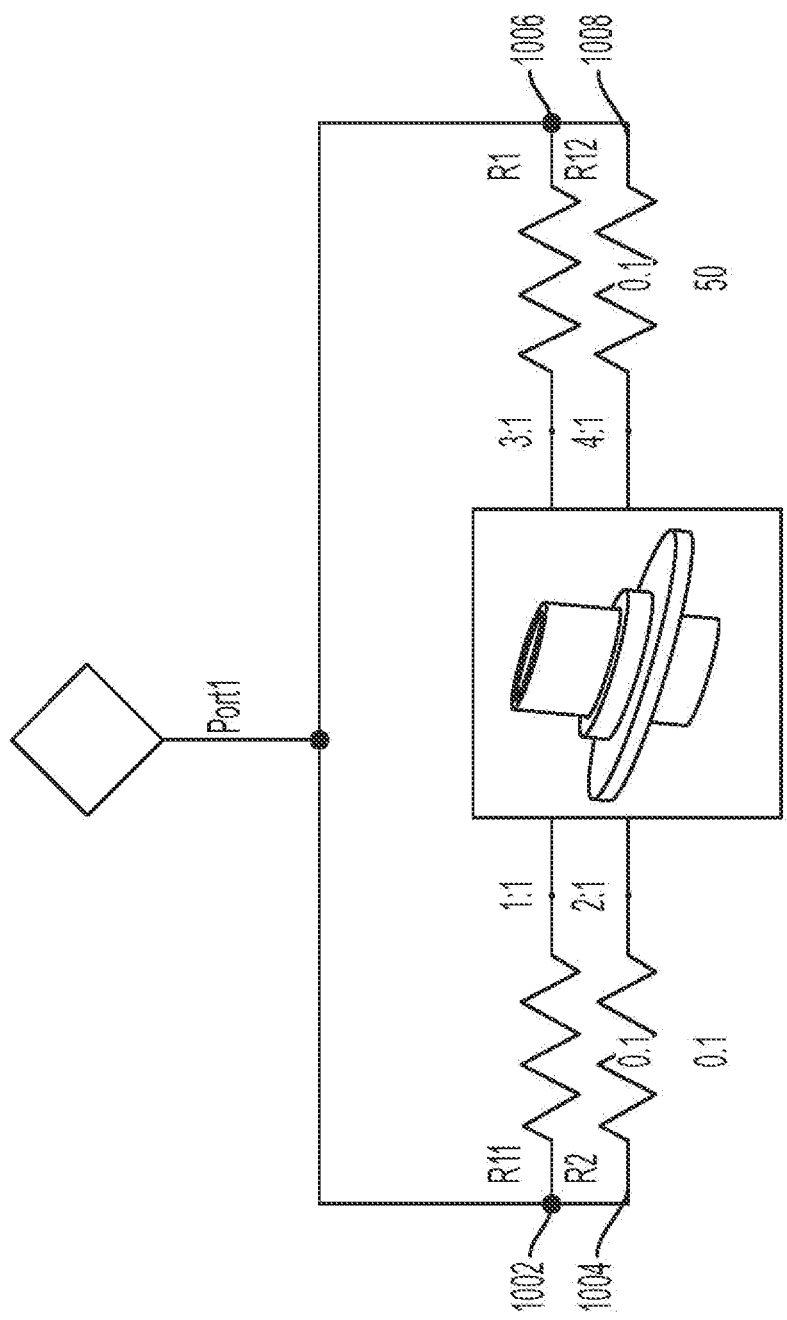
FIG. 10 depicts an exemplary illustration of non-contacting ground connections being formed using a plurality of resistive elements.
Figure 11:
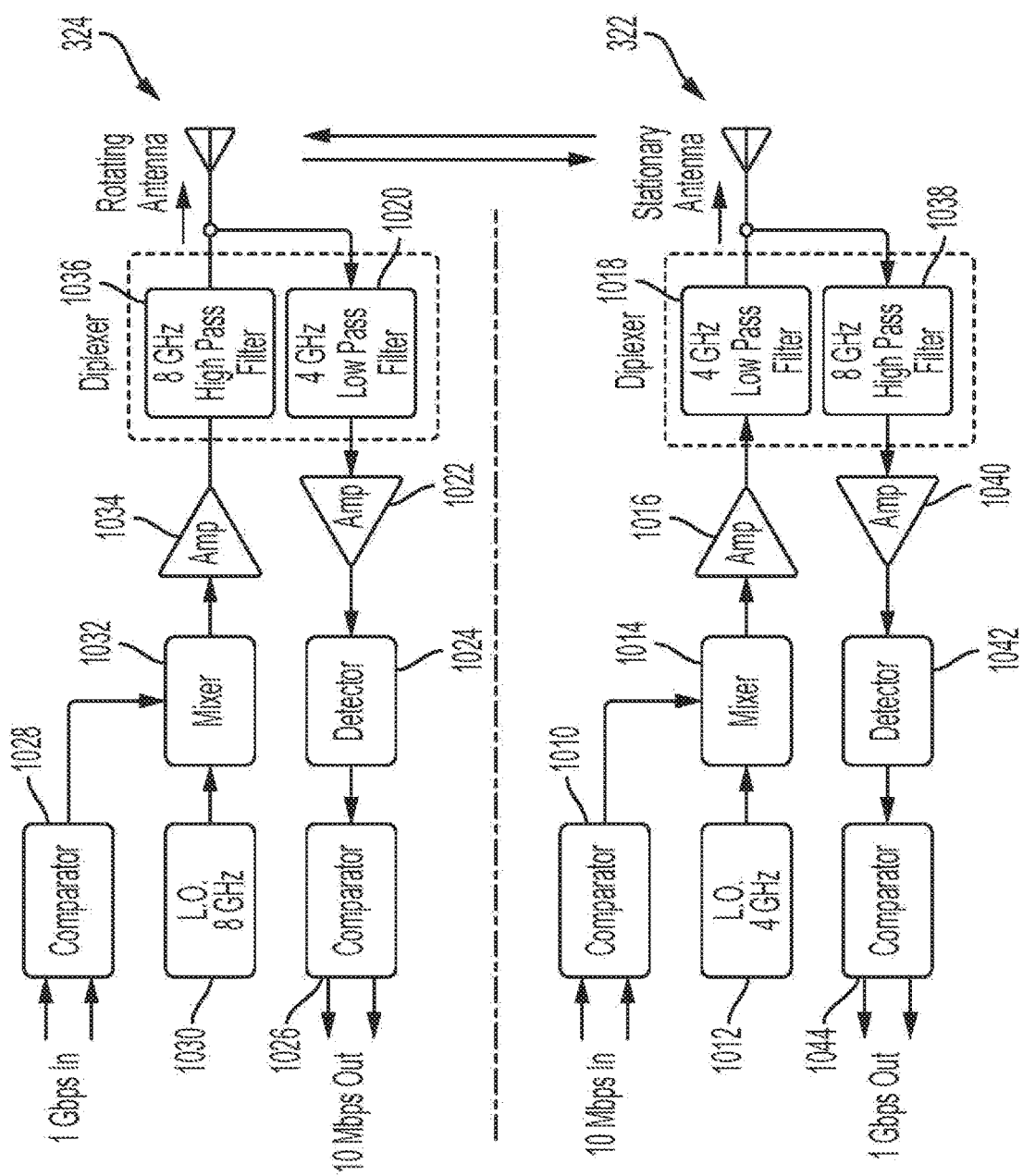
FIG. 11 depicts an exemplary block diagram of the first antenna array and the second antenna array.

It is also contemplated non-contacting ground connections may be employed to shunt the cavity currents from the bearing assemblies used to allow rotation of the center shaft 320. For instance, FIG. 10 illustrates the non-contacting ground connections being formed using a plurality of resistive elements 1002-1008. As illustrated, the resistive elements 1002-1008 may be constructed in a parallel to shunt the current from the bearings. It is contemplated the net parallel impedance of the resistive elements 1002-1008 between static ground and the rotating ground may be operably between 8 ohms and 3 ohms. It is also contemplated the non-contact ground connections on the first portion 304 (i.e., static portion) may be assembled using a flex cable and the non-contact ground connections on the second portion 302 (i.e., rotating portion) may be connected using a coaxial cable. The connections may permit a 6-7 dB that provides a variation with the shaft angle.

Figure 12:
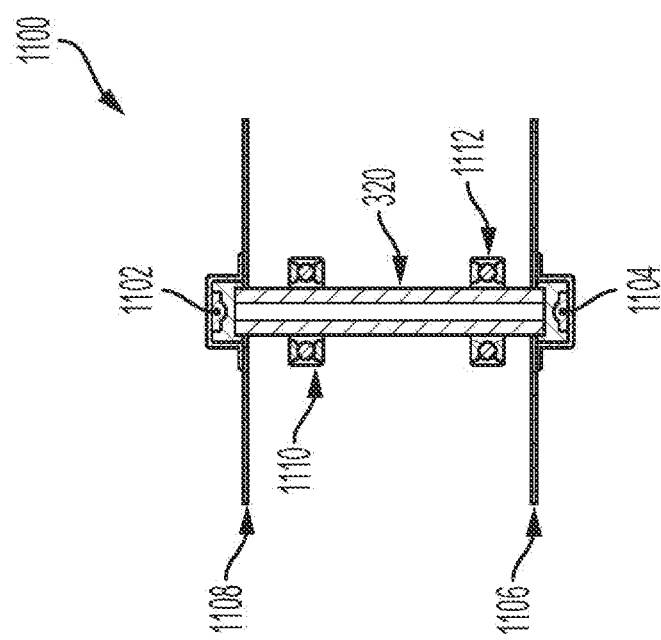
FIG. 12 depicts an exemplary illustration of an optical bi-directional optical data link.

FIG. 12 illustrates a block diagram of the first antenna array 322 (i.e., stationary antenna array) and the second antenna array 324 (i.e., rotating antenna array). Again, the first antenna array 322 (i.e., stationary antenna array) and the second antenna array 324 may be operable to provide a bi-directional communication link. The link is operable to allow data and information to be transmitted or downloaded from the second antenna array 324 to the first antenna array 322. Or the link is operable to allow data and information to be transmitted or uploaded from the first antenna array 322 to the second antenna array 324. Uploaded data/information may include software updates, parameters or settings used within processor(s), memory, or sensor units located within portion 302. Downloaded data/information may include data acquired relating to objects surrounding the LIDAR system.

As illustrated, the first antenna array 322 may be operable to transmit or upload data to the second antenna array 324 at a speed of 10-50 Mbps. The upload data may be received by the first antenna array 322 at a comparator module 1010. A mixer circuit 1014 may mix the incoming data from comparator with a L.O. frequency driver 1012 (e.g., 4 GHz). The mixer 1014 may then provide the mixed data to an amplifier circuit 1016 which is then passed through a diplexer circuit that includes a low pass filter 1018. As illustrated the low pass filter 1018 may be operating at 4 GHz. The upload data is then transmitted (i.e., uploaded) to the second antenna array 324. Once received, the upload data is provided through low pass filter 1020 to amplifier 1022, and then to a detector circuit 1024. Lastly, the upload data is provided to a comparator 1026 that may operate at same speed as comparator 1010 (e.g., 10 Mbps).

Conversely, download data may be transmitted at speeds of 1 Gbps (i.e., 8 GHz). The download data may be received by the second antenna array 324 at a comparator module 1028. A mixer circuit 1032 may mix the incoming data from comparator with a L.O. frequency driver 1030 (e.g., 4 GHz). The mixer 1032 may then provide the mixed data to an amplifier circuit 1034 which is then passed through a diplexer circuit that includes a high pass filter 1036. As illustrated the high pass filter 1036 may be operating at 8 GHz. The download data is then transmitted (i.e., downloaded) to the first antenna array 322. Once received, the download data is provided through high pass filter 1038 to amplifier circuit 1040, and to detector circuit 1042. Lastly, the download data is provided to a comparator 1044 that may operate at same speed as comparator 1028 (e.g., 1 Gbps).

FIG. 12 illustrates an alternative embodiment where an optical bi-directional optical data link 1100 may be used to transmit electrically encoded data optically between the first portion 304 (i.e., static portion) and the second portion 302 (i.e., rotating portion). It is contemplated, the optical data link 1100 may be used together with the first antenna array 322 and second antenna array 224. Or, the optical data link 1100 may be used in place of the first antenna array 322 and second antenna array 224. As illustrated, the center shaft 320 may be constructed to include a free-space aperture (e.g., hollow portion) through the middle of the center shaft thereby allowing data transfer by light transmission between a first optical transceiver 1102 and a second optical transceiver 1104. It is contemplated the free-space aperture may be constructed along the axis of rotation of the center shaft 320.

As illustrated the shaft 320 may be included within the second portion 302 and may be connected to a rotating printed circuit board (PCBA) operable to transmit and receive data optically using optical transceiver 1102. A stationary PCBA 1106 may be included within first portion 302 and may be connected to the second optical transceiver 1104. One or more bearing assemblies 1110, 1112 may further be connected and operably allow center shaft 320 to rotate.

Figure 13:
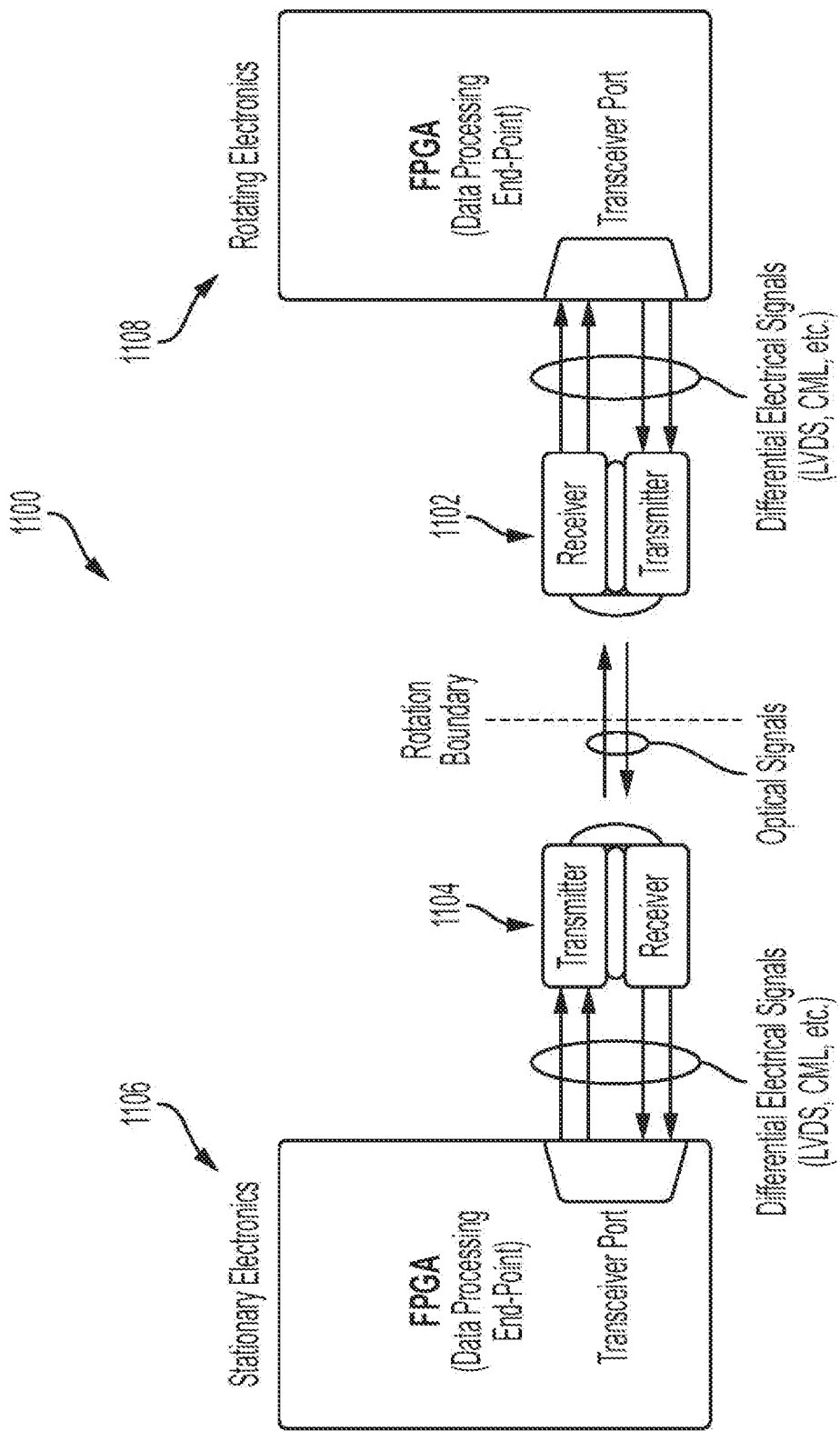
FIG. 13 depicts an exemplary block diagram of the optical bi-directional optical data link.

FIG. 13 is another exemplary block diagram of the bidirectional data optical data link 1100 used to transmit electrically encoded data optically between the first portion 304 (i.e., static portion) and the second portion 302 (i.e., rotating portion). Again, a rotating printed circuit board (PCBA) 1108 may operably transmit and receive data optically using optical transceiver 1102. A stationary PCBA 1106 may be included within first portion 302 and may be connected to the second optical transceiver 1104. As further illustrated, transceiver 1104 and transceiver 1102 may include both a transmitter and receiver operable to transmit and receive optical signals along a rotation boundary within the center shaft 320.

It is contemplated the PCBA 1108, 1106 may designed using an FPGA operable to receive and transmit differential electrical signals (e.g., LVDS, CML). It is also contemplated optical data transfer may be insensitive to the relative angular rotation between the first optical transceiver 1102 and the second optical transceiver 1104. The baseband electrical signal may also be converted into an optical pulse train for transfer across the rotating boundary of the center shaft 320. The baseband electrical signal may also be operable to encode the data to be transferred. Upon receiving an optical pulse train, transceiver 1102 or transceiver 1104 may convert the pulse train into an electrical signal which encodes the data to be transferred. Transceiver 1102 and transceiver 1104 may also be operable to simultaneously transfer data in both directions on axis from either transceiver 1104 or transceiver 1102. For instance, transceiver 1102, 1104 may be designed using a Broadcom AFBR-FS13B25 optical transceiver.

The PCBA 1106 or 1108 may also provide direction connections at each end-point using known hardware, electrical, and protocol interfaces. The mechanical mounting of each transceiver 1102, 1104 may be designed to maintain optical alignment along the rotational boundary axis to help aid in precluding contamination (e.g., dust, dirt, etc.) of the optical surfaces. Lastly, it is contemplated the bidirectional data optical data link 1100 may be advantageous as it is less susceptible to electro-mechanical (EM) interference.

Figure 14:
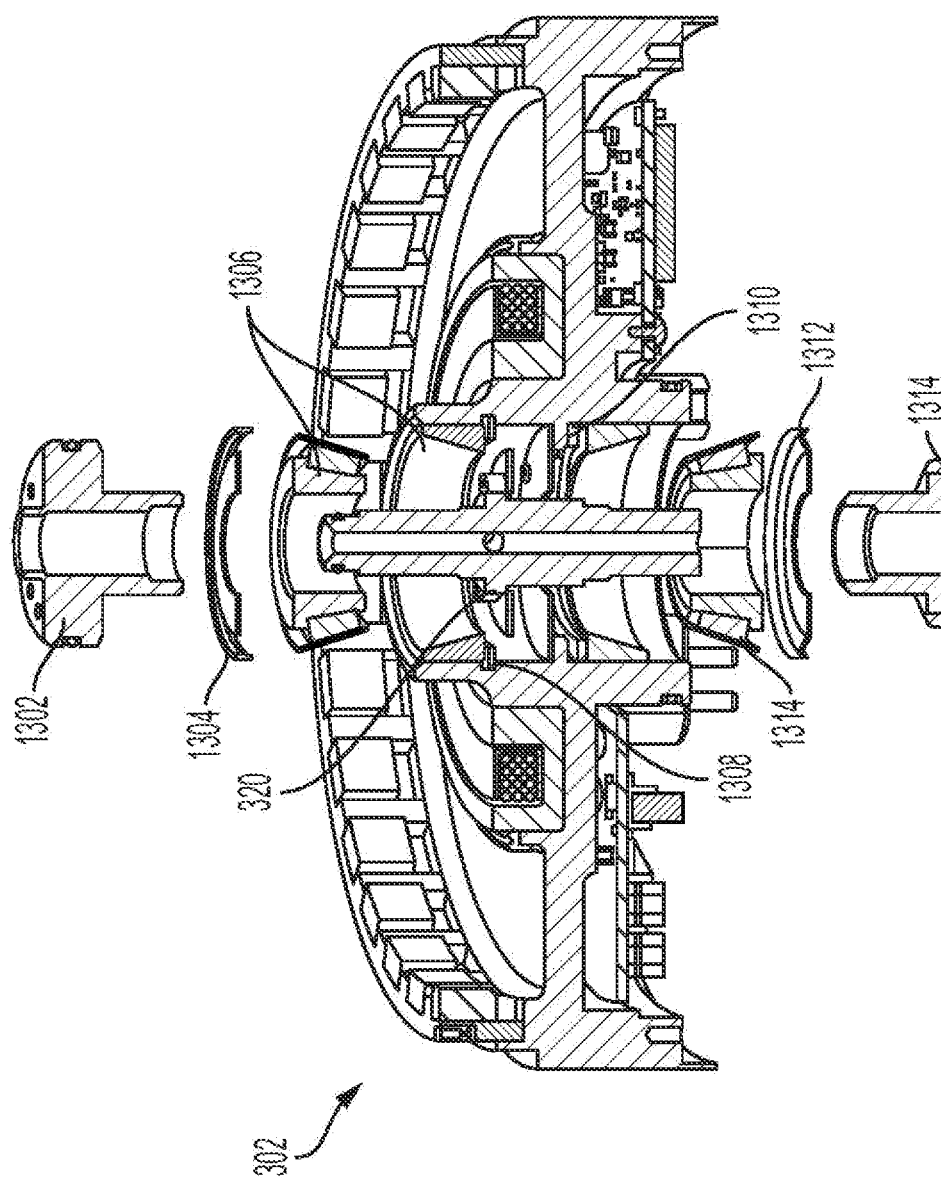
FIG. 14 depicts an exemplary exploded view of the LIDAR assembly.

FIG. 14 is an exemplary exploded view of the LIDAR assembly 300 discussed with reference to FIG. 3 above. As illustrated an upper bearing flange 1302 and lower bearing flange 1314 may be used to attach bearing seal 1304 and bearing seal 1312 to a pair of tapered roller bearings 1306, 1314. Flange 1302, 1314 may also be operable to stabilize and maintain center shaft 320 within the LIDAR assembly 300. Roller bearings 1306, 1314/may also allow upper portion 302 and center shaft 320 to rotate smoothly.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable mediums having computer readable program code embodied thereon.

Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (erasable programmable read-only memory (EPROM) or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A bi-directional data communication link, comprising:
a LIDAR assembly including a stationary portion configured for attachment to an autonomous vehicle and a second portion rotatably operable to rotate in relation to the stationary portion, wherein the second portion includes one or more emitting devices and receiving devices for detecting objects surrounding the autonomous vehicle;
a first printed circuit board assembly (PCBA) located within the stationary portion, the first PCBA including a first optical transceiver;
a second PCBA located within the second portion, the second PCBA including a second optical transceiver; and
a hollow shaft extending between the stationary portion and the second portion,
wherein the first optical transceiver is disposed at a first open end of the hollow shaft and the second optical transceiver is disposed at a second open end of the hollow shaft, the first optical transceiver being configured to transmit a first optical data signal within the hollow shaft to the second optical transceiver, and the second optical transceiver being configured to transmit a second optical data signal within the hollow shaft to the first optical transceiver, wherein the hollow shaft extends through and rotates with the second PCBA, and wherein the hollow shaft overlaps the second PCBA in a direction perpendicular to an axis of rotation.

2. The system of claim 1, wherein the first optical data signal is transmitted as a first optical pulse train, and the second optical data signal is transmitted as a second optical pulse train.

3. The system of claim 1, wherein the first optical data signal is encoded by the first PCBA prior to being transmitted to the second optical transceiver, and wherein the second PCBA is configured to decode the first optical data signal.

4. The system of claim 1, further comprising:

a first antenna array positioned around the hollow shaft and affixed to the stationary portion, and a second antenna array affixed to the second portion or the hollow shaft.

5. The system of claim 1, wherein the second optical data signal is encoded by the second PCBA prior to being transmitted to the first optical transceiver, and wherein the first PCBA is configured to decode the second optical data signal.

6. The system of claim 4, wherein the hollow shaft rotates with the second antenna array.

7. The system of claim 1, wherein the first optical transceiver and the second optical transceiver are positioned to maintain optical alignment along a rotational boundary axis between the stationary portion and the second portion.

8. The system of claim 1, wherein an airtight seal is formed between the first optical transceiver, the second optical transceiver, and the hollow shaft to prevent degradation of the first optical signal and the second optical signal by external contaminants.

9. The system of claim 1, wherein the first optical data signal and the second optical data signal are transmitted simultaneously.

10. The system of claim 1, wherein the first PCBA and the first transceiver are connected using a first differential communication link and the second PCBA and the second transceiver are connected using a second differential communication link.

11. The system of claim 10, wherein the first differential communication link is a first low voltage differential signaling system and the second differential communication link is a second low voltage differential signaling system.

12. The system of claim 10, wherein the first differential communication link is a first current-mode logic system and the second differential communication link is a second current-mode logic system.

13. The system of claim 1, wherein one or more bearings are connected to an outer surface of the hollow shaft and to the second portion.

14. A bi-directional data communication method, comprising:

transmitting a first optical data signal within a hollow shaft from a first optical transceiver to a second optical transceiver, wherein the first optical transceiver is connected to a first PCBA located within a stationary portion of a LIDAR assembly, and the stationary portion is configured for attachment to an autonomous vehicle;

transmitting a second optical data signal within the hollow shaft from the second optical transceiver to the first optical transceiver, wherein the second optical transceiver is connected to a second PCBA located within a second portion of a LIDAR assembly, wherein the second portion is operable to rotate in relation to the stationary portion, wherein the hollow shaft extends through and rotates with the second PCBA.

15. The method of claim 14, further comprising: transmitting the first optical data signal as a first optical pulse train; and transmitting the second optical data signal as a second optical pulse train.

16. The method of claim 14, encoding the first optical data signal prior to being transmitted to the second optical transceiver; and encoding the second optical data signal prior to being transmitted to the first optical transceiver.

17. The method of claim 14, further comprising: preventing external contaminants from degrading the first optical signal and the second optical signal using an airtight seal between the hollow shaft, the first transceiver, and the second transceiver.

18. The method of claim 14, further comprising: electrically connecting the first PCBA and the first transceiver using a first differential communication link; and electrically connecting the second PCBA and the second transceiver using a second differential communication link.

19. The method of claim 18, wherein the first differential communication link is a first low voltage differential signaling system and the second differential communication link is a second low voltage differential signaling system.

20. A data communication link, comprising:

a LIDAR assembly including a stationary portion configured for attachment to an autonomous vehicle and a second portion operable to rotate in relation to the stationary portion, wherein the second portion includes one or more emitting devices and receiving devices for detecting objects surrounding the autonomous vehicle; and a hollow shaft extending between the stationary portion and the second portion, wherein a first optical transceiver is disposed at a first open end of the hollow shaft and a second optical transceiver is disposed at a second open end of the hollow shaft, and the first optical transceiver and the second optical transceiver are configured for bi-directional communication using one or more optical data signals, and wherein the hollow shaft extends through and rotates with the second portion.

* * * * *